United States Patent [19]

Inoue et al.

[11] 4,426,498

[45] Jan. 17, 1984

[54] POLYETHYLENE COMPOSITION COMPRISING LLDPE AND RUBBER

[75] Inventors: Hiroshi Inoue, Ooi; Masaaki Isoi, Ogose; Kazuo Sei, Yokohama, all of Japan

[73] Assignee: Toa Nenryo Kogyo Kabushiki Kaisha, Tokyo, Japan

[21] Appl. No.: 359,399

[22] Filed: Mar. 18, 1982

[30] Foreign Application Priority Data

Apr. 7, 1981 [JP] Japan ................................. 56-51099

[51] Int. Cl.$^3$ ...................... C08L 23/08; C08L 23/20
[52] U.S. Cl. .................................. 525/240; 525/211; 525/232
[58] Field of Search ........................ 525/74, 194, 240

[56] References Cited

U.S. PATENT DOCUMENTS

| | | | |
|---|---|---|---|
| 3,374,198 | 3/1968 | Falcon et al. | 525/74 |
| 3,806,558 | 4/1974 | Fischer | 525/240 |
| 3,873,643 | 3/1975 | Wu et al. | 260/878 |
| 3,962,018 | 6/1978 | Costemalle et al. | 525/240 |
| 4,076,698 | 2/1978 | Anderson et al. | 526/348.6 |
| 4,104,210 | 8/1978 | Coran et al. | 260/4 R |
| 4,337,188 | 6/1982 | Climenhage et al. | 524/245 |
| 4,339,507 | 7/1982 | Kurtz et al. | 525/240 |
| 4,367,841 | 1/1983 | Mazumdar | 525/240 |

FOREIGN PATENT DOCUMENTS 739634 11/1955 United Kingdom .
815805 7/1959 United Kingdom .

OTHER PUBLICATIONS

Exxon Publication–"Elastomers for Polyolefin Modification", 1975 pp. 1, 9–11 and 47–49.

*Primary Examiner*—Carman J. Seccuro
*Attorney, Agent, or Firm*—Robert L. Graham

[57] ABSTRACT

An improved polyethylene composition is disclosed. The composition comprises linear low density polyethylene (an ethylene/alpha-olefin copolymer) and a synthetic rubber. In one embodiment the composition includes a synthetic rubber reacted with a carboxylic acid.

7 Claims, No Drawings

POLYETHYLENE COMPOSITION COMPRISING LLDPE AND RUBBER

BACKGROUND OF THE INVENTION

1. Field of the Invention

The present invention relates to a polyethylene composition comprising linear low density polyethylene and synthetic rubber.

2. Description of the Prior Art

Heretofore, high-pressure low density polyethylene (LDPE) and medium- and low-pressure high density polyethylene (HDPE) have been used for moldings, films, laminates, wire and cable coverings, and steel pipe coating by injection molding, extrusion molding, blow molding, and the like by virtue of their outstanding chemical resistance, electrical insulation, and moldability. Recently, linear low density polyethylene (L-LDPE), which is produced by copolymerization of ethylene and alpha-olefin under a low pressure, is attracting attention because it is superior to LDPE in mechanical strength and durability.

L-LDPE is still deficient in environmental stress cracking resistance when used for certain coverings of electric wires and cables, steel wires, and steel pipes.

SUMMARY OF THE INVENTION

It has been found that when L-LDPE is incorporated with synthetic rubber, the resulting composition exhibits improved ESCR.

The present invention provides a polyethylene composition which comprises linear low density polyethylene and synthetic rubber, said linear low density polyethylene being a copolymer of ethylene and alpha-olefin, having a density of 0.915 to 0.935, and having a ratio of 3 to 12 for weight-average molecular weight to number-average molecular weight (abbreviated as Mw/Mn hereunder).

The L-LDPE used in this invention is produced by copolymerizing ethylene with alpha-olefin selected from the group consisting of butene-1, pentene-1, hexene-1, heptene-1, octene-1, and 4-methylpentene-1, at a ratio of 3 to 14 wt.% in the presence of a chromium catalyst or Ziegler catalyst by the gas phase method, liquid phase method, or solution method. L-LDPE thus produced has a density of 0.915 to 0.935, an Mw/Mn ratio of 3 to 12, and an MI of 0.1 to 50 [as measured by ASTM D-1238E (190° C., 2160 g); the same shall apply hereunder]. Preferable among them is one which is produced by the gas phase method.

The synthetic rubber used in the present invention includes a copolymer rubber of ethylene and an alpha-olefin selected from the group consisting of propylene, butene-1, pentene-1, hexene-1, 4-methylpentene-1, and octene-1; ethylene-propylene nonconjugated diene rubber (EPDM), isoprene rubber (IR), butyl rubber (BR), and styrene-butadiene thermoplastic rubber (SBR). Preferable among them is ethylene-alpha-olefin copolymer rubber, and most preferable is ethylene-butene-1 copolymer rubber (EBR). These synthetic rubbers should preferably have a Mooney viscosity of 10 to 150 ($ML_{1+4}$ 100° C., JIS K6300 [the same shall apply hereunder]), and a crystallization degree less than 30%. Such ethylene-alpha-olefin copolymer rubbers usually have a density lower than 0.9.

The composition of the present invention can be obtained by incorporating L-LDPE with synthetic rubber, followed by melting and mixing. More specifically, L-LDPE and synthetic rubber are mixed by a Henschel mixer or ribbon blender and the mixture is melted and kneaded at a temperature higher than the melting point of polyethylene but lower than 250° C. using a Banbury mixer or single screw or multiscrew extruder. For synthetic rubber in the form of bale, a Banbury mixer or roll mill is suitable for heating, melting, and mixing. The blending ratio of L-LDPE and synthetic rubber should preferably be 70 to 98 parts by weight for L-LDPE and 30 to 2 parts by weight for synthetic rubber. If the synthetic rubber is less than 2 parts by weight, no improvement is made in ESCR; and conversely, if it is more than 30 parts by weight, ESCR is improved but mechanical strength decreases.

The synthetic rubber in the composition of this invention may be replaced by a modified synthetic rubber or a mixture of an unmodified synthetic rubber and such a modified synthetic rubber. This modified synthetic rubber can be produced by adding to a synthetic rubber an unsaturated carboxylic acid or a derivative thereof such as maleic anhydride, acrylic acid, methacrylic acid, and endo-bicyclo[2,2,1]-5-heptene-2,3 dicarboxylic acid anhydride in an amount of 0.05 to 3 wt.% in the presence of an organic peroxide such as 2,5-dimethyl-2,5-di(t-butylperoxy)-hexene-3 and di-t-butyl peroxide. If such a modified synthetic rubber is incorporated, the resulting composition is improved not only in ESCR, tensile strength, elongation, etc. but also in adhesion. Therefore, such a composition can be used to make laminates with a metal or a thermoplastic resin such as polyamide, polyolefin, polyvinylformal (Vinylon), polyester, and polyvinyl chloride.

As mentioned above, the composition of this invention has high ESCR, tensile strength, and elongation, and films produced from the composition have greatly improved heat-sealability, transparency, and gloss. Thus, the composition of this invention is suitable for films, stretched films, sheets, and coverings of electric wires and cables, steel pipes, metal plates and steel wires.

The composition of this invention may be incorporated, as required, with a weathering agent, antioxidant, heat stabilizer, molding aid, colorant, and the like.

The invention is described in detail by the following examples. In Examples and Referential Examples, "parts" means "parts by weight", and ESCR and high-speed tensile elongation were evaluated by the following test methods.

(1) ESCR: (in conformity with ASTM D-1693)
  (A) Test piece: 38×12.7×2 mm
  (B) Surface active agent: 10% aqueous solution of Igepal
  (C) Test temperature: 50° C.
(2) High-speed tensile elongation (JIS K-6760)
  (A) Rate of pulling: 500 mm/min ±10%.

EXAMPLES 1 TO 7

The compositions of this invention were prepared by mixing L-LDPE and ethylene-butene-1 copolymer rubber (MI: 4.0, density: 0.88) in the ratios shown in Table 1 using an extruder at 220° C. The physical properties of the resulting compositions are shown in Table 1.

TABLE 1

| Example No. | 1 | 2 | 3 | 4 | 5 | 6 | 7 |
|---|---|---|---|---|---|---|---|
| L-LDPE (parts) | 95 | 85 | 75 | 90 | 90 | 90 | 90 |
| MI (g/10 min) | 12.0 | 12.0 | 12.0 | 5.0 | 2.0 | 10.0 | 10.0 |
| Density (g/cc) | 0.926 | 0.926 | 0.926 | 0.934 | 0.920 | 0.926 | 0.926 |
| Mw/Mn | 5.0 | 5.0 | 5.0 | 6.0 | 6.0 | 5.0 | 7.0 |
| Comonomer* | Bu | Bu | Bu | Bu | Bu | Bu | He |
| Ethylene-butene-1 (parts) copolymer rubber | 5 | 15 | 25 | 10 | 10 | 10 | 10 |
| Properties | | | | | | | |
| MI 190° C. (g/10 min) | 10.0 | 7.7 | 6.5 | 4.3 | 2.5 | 8.0 | 8.0 |
| Density (g/cc) | 0.924 | 0.919 | 0.913 | 0.930 | 0.916 | 0.922 | 0.922 |
| ESCR | | | | | | | |
| 50% cracking (time) | 200 | >1000 | >1000 | >1000 | >1000 | >1000 | >1000 |
| Cracking after 1000 hours (%) | 100 | <5 | <5 | <10 | <5 | <10 | <10 |
| High-speed tensile elongation (%) | 700 | 700 | 700 | 700 | 700 | 700 | 700 |

*Bu: Buten-1, He: Hexene-1

REFERENTIAL EXAMPLES 1 TO 7

For the purpose of reference, L-LDPE alone, LDPE alone, HDPE alone, and a composition of LDPE and ethylene-butene-1 copolymer rubber prepared as in Example 1 were evaluated for their physical properties. The results are shown in Table 2.

TABLE 2

| Ref. Example No. | 1 | 2 | 3 | 4 | 5 | 6 | 7 |
|---|---|---|---|---|---|---|---|
| Type of PE | L-LDPE | L-LDPE | L-LDPE | HDPE | LDPE | LDPE | LDPE |
| (parts) | 100 | 100 | 100 | 100 | 100 | 95 | 85 |
| MI (g/10 min) | 12.0 | 2.0 | 10.0 | 8.0 | 2.0 | 2.0 | 2.0 |
| Density (g/cc) | 0.926 | 0.920 | 0.926 | 0.960 | 0.919 | 0.919 | 0.919 |
| Mw/Mn | 5.0 | 6.0 | 5.0 | — | — | — | — |
| Comonomer* | Bu | Bu | He | — | — | — | — |
| Ethylene-butene-1 (parts) copolymer rubber | 0 | 0 | 0 | 0 | 0 | 5 | 15 |
| Properties | | | | | | | |
| MI 190° C. (g/10 min) | 12.0 | 2.0 | 10.0 | 8.0 | 2.0 | 2.1 | 2.3 |
| Density (g/cc) | 0.926 | 0.920 | 0.926 | 0.960 | 0.919 | 0.917 | 0.913 |
| ESCR | | | | | | | |
| 50% cracking (time) | 5 | 100 | 50 | 1(−) | 1(−) | 1.0 | 25 |
| Cracking after 1000 hours (%) | 100 | 100 | 100 | 100 | 100 | 100 | 100 |
| High-speed tensile elongation (%) | 400 | 480 | 600 | 20 | 300 | 400 | 600 |

*Bu: Butene-1, He: Hexene-1

EXAMPLE 8 AND REFERENTIAL EXAMPLE 8

A 30 micron thick film was produced from the composition of Example 5 using a T-die film extrusion machine for thermoplastic resin. For the purpose of reference, a 30 micron thick film was produced from the L-LDPE of Referential Example 2. The resulting films were evaluated for gloss (ASTM D-523, incident angle of 45°), haze (ASTM D-1003), and heat seal strength. The heat seal strength was determined by measuring with an Ingstrom type universal tester at heat sealing temperature the peel strength of the heat-sealed part formed under a pressure of 2 kg/cm and for a period of 1 second using Toyo Seiki's heat inclination tester. The results are shown in Table 3.

TABLE 3

| Film Properties | | Example 8 | Ref. Ex. 8 |
|---|---|---|---|
| Glosses (%) | | 145 | 128 |
| Haze (%) | | 1.5 | 3.6 |
| Heat seal strength (g/15 mm) | | | |
| Seal temp. | 100° C. | 180 | 0 |
| | 105° C. | 300 | 50 |
| | 110° C. | 500 (+) | 100 |
| | 115° C. | 500 (+) | 420 |
| | 120° C. | 500 | 450 |

(+)

EXAMPLE 9

A composition was prepared by mixing the L-LDPE used in Example 1, at the ratio shown in Table 4, with a modified synthetic resin prepared as follows: To 100 parts of ehtylene-butene-1 copolymer rubber used in Example 1 were added 1.1 parts of maleic anhydride and 0.025 part of 2,5-dimethyl-2,5-di-(t-butyl peroxide)-hexene-3 (initiator). The mixture was kneaded using an extruder at 220° C. so that 1.0 wt.% of acid was added to the synthetic rubber. The resulting composition was measured for physical properties, and evaluated for adhesion by measuring peel strength of laminates produced from the composition.

The peel strength and melt tensile strength were measured according to the following methods.

(1) Peel strength

Preparation of test piece (A) Aluminum laminate

A three-layered laminate consisting of two aluminum sheets (0.1 mm thick) sandwiching an intermediate layer (0.1 mm thick) of the composition, was cut into a 25 mm wide specimen.

(B) Iron laminate

A two-layered laminate consisting of a bonderized iron plate (3.2 mm thick) and a layer 2 mm thick) of the composition, was cut into a 10 mm wide specimen.

(C) Nylon laminate

A three-layered laminate consisting of two nylon-6 layers (0.1 mm thick) sandwiching an intermediate layer (0.1 mm thick) of the composition, was cut into a 25 mm wide specimen.

These specimens were measured for 90° peel strength on an Ingstrom type universal tester.

(2) Melt tensile strength

The flowability was evaluated by measuring the tensile force required to pull at a constant rate the molten resin extruded from the orifice of a melt indexer under the following conditions.

(A) Orifice: 2.095 mm$\phi \times$ 8 mm
(B) Test temperature: 190° C.
(C) Extrusion rate of resin: 10 mm/min
(D) Take-up rate of resin: 5.5 m/min.

TABLE 4

| Example No. | 9 |
| --- | --- |
| L-LDPE (parts) | 90 |
| Modified synthetic rubber (parts) | 10 |
| Properties | |
| Quantity of acid added (wt %) | 0.10 |
| MI (g/10 min) | 7.0 |
| Density (g/cc) | 0.922 |
| ESCR $F_{50}$ (time) | >1000 |
| High-speed elongation (%) | 700 |
| Melt pulling force (G) | 0.7 |
| Peel strength | |
| Iron (kg/cm) | 4.5 |
| Aluminum (kg/2.5 cm) | 4.0 |
| Nylon-6 (kg/2.5 cm) | 8.0 |

What is claimed is:

1. A polyethylene composition which comprises:
    (a) from 70 to 98 parts by weight of linear low density polyethylene comprising a copolymer of ethylene and an alpha-olefin having a density of 0.915 to 0.935 and Mw/Mn ratio of 3 to 12; and
    (b) from 2 to 30 parts by weight of an ethylene-butene-1 copolymer rubber having a density lower than 0.9.

2. A thermoplastic coating composition for wire, cable or pipe which exhibits improved environmental stress cracking resistance, said coating comprising:
    (a) from 70 to 98 parts by weight linear low density polyethylene comprising a copolymer of ethylene and an alpha-olefin and having a density of 0.915 to 0.935 and Mw/Mn ratio of 3 to 12; said alpha-olefin constituting from 3 to 14 weight percent of the copolymer and being selected from butene-1, pentene-1, hexene-1, heptene-1, octene-1, and 4-methylpentene;
    (b) from 2 to 30 parts by weight of an ethylene-butene-1 copolymer rubber having a density lower than 0.9.

3. A composition as set forth in claim 1, in which the alpha-olefin is an olefin selected from the group consisting of butene-1 pentene 1, hexene-1 heptene 1, 4-methylpentene-1, and octene-1.

4. A composition as defined in claim 1, wherein the synthetic rubber is reacted with from 0.01 to 3.0 weight percent of carboxylic acid or derivative thereof in the presence of an organic peroxide.

5. A composition as defined in claim 2, wherein the copolymer comprises from 3 to 14 weight percent of the alpha-olefin.

6. The composition of claim 3 wherein the linear low density polyethylene is produced by a low pressure process.

7. The composition of claim 6 wherein the linear low density polyethylene produced by a gas phase process.

* * * * *